United States Patent [19]
Parrack

[11] 3,979,713
[45] Sept. 7, 1976

[54] METHOD OF MARINE REFLECTION-TYPE SEISMIC EXPLORATION

[75] Inventor: Alvin L. Parrack, Bellaire, Tex.

[73] Assignee: Texaco Inc., New York, N.Y.

[22] Filed: Aug. 19, 1974

[21] Appl. No.: 498,787

[52] U.S. Cl. .................................. 340/7 R; 340/3 T
[51] Int. Cl.² ..................... G01V 1/00; H04B 13/00; H04R 15/00
[58] Field of Search ............... 340/7 R, 3 T, 15.5 F; 181/108, 110, 112, 118, 140

[56] References Cited
UNITED STATES PATENTS

| | | | |
|---|---|---|---|
| 3,331,050 | 7/1967 | Kilmer et al. | 340/7 R |
| 3,757,287 | 9/1973 | Bealor, Jr. | 340/3 T |

FOREIGN PATENTS OR APPLICATIONS

| | | | |
|---|---|---|---|
| 1,193,507 | 6/1970 | United Kingdom | 340/7 R |

*Primary Examiner*—Maynard R. Wilbur
*Assistant Examiner*—T. M. Blum
*Attorney, Agent, or Firm*—T. H. Whaley; C. G. Ries; Henry C. Dearborn

[57] ABSTRACT

Seismic exploration method applicable to marine surveys. It involves making a dual spread of detectors which are spaced apart vertically. The signals received at one of the spreads are subtracted from corresponding signals received at the other spread. This eliminates horizontally travelling energy signals by cancellation.

7 Claims, 3 Drawing Figures

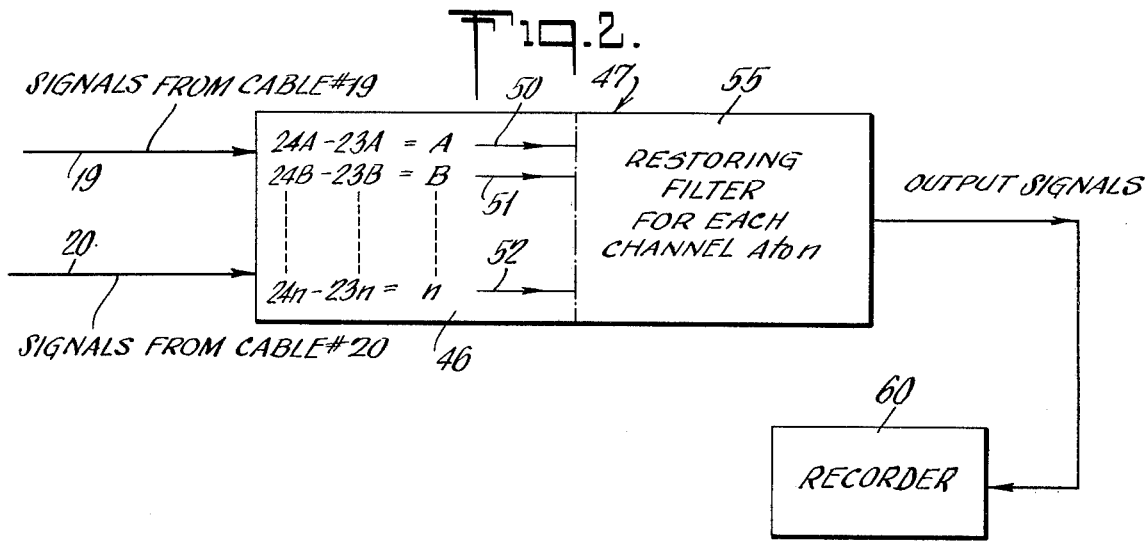
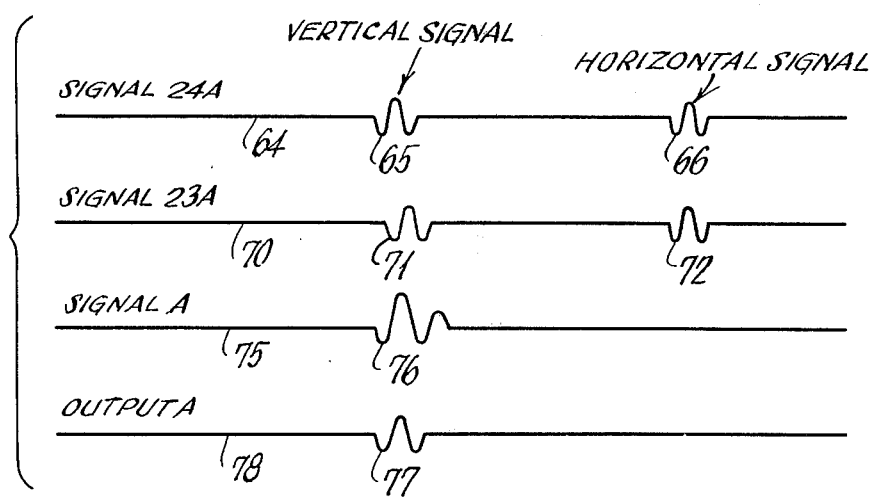

3,979,713

METHOD OF MARINE REFLECTION-TYPE SEISMIC EXPLORATION

BACKGROUND OF THE INVENTION

1. Field of the Invention

This invention relates to seismic exploration in general. More specifically, it concerns an improved method of reflection-type seismic exploration that is particularly applicable to marine operations.

2. Description of the Prior Art

It has been known for quite some time that in marine seismic operations, there are particular problems that are not encountered in land operations. One aspect stems from the fact that in marine operations the seismic detectors placed below the surface of the water are sensitive to seismic waves in the water regardless of their direction of travel. Furthermore, pressure-type detectors are usually used, whereas in land operations the detectors are ordinarily a displacement or inertia type.

Heretofore, in marine operations, the seismic waves were often generated by detonation of an explosive charge which was usually placed at a depth of ten feet or less below the surface. This avoided interference produced by the phenomenon commonly called "bubble bounce", which interference is generated by charges fired at greater depth. However, a problem has remained in offshore seismic exploration which stems from the fact that water is an efficient propagator of sound and seismic energy waves travel long distances horizontally. Therefore, any such signals returning to or otherwise arriving at the detectors or hydrophones, are interfering and so detrimental to the desired reflection data.

While it has heretofore been suggested to use a plurality of vertically displaced detector spreads in seismic prospecting carried out in water, such suggestion dealt with overcoming interferences from energy reflected back down into the water by air-water interface. No part of that concept was related to horizontally travelling seismic energy.

Consequently, it is an object of this invention to provide an improved method of marine-type seismic surveying. Furthermore, another object is to provide a method of marine-type seismic exploration which eliminates undesirable horizontally travelling seismic wave energies from a recording.

SUMMARY OF THE INVENTION

Briefly, the invention concerns marine reflection type seismic exploration. It concerns a method for improving the character of recorded data which is developed from seismic detectors located in a body of water. The method comprises the steps of creating a source of seismic energy in said body of water and locating at least two of said detectors spaced vertically apart in said body of water. It also comprises the step of subtracting the signals generated by one of said detectors from the signals generated by the other of said detectors, in order to cancel horizontal-travelling seismic energy while reinforcing vertical-travelling energy.

Again, briefly, the invention concerns marine reflection-type seismic exploration, and it provides a method for improving the character of recorded data developed from seismic detectors located in a body of water. The method comprises creating a source of seismic energy in said body of water, and locating a plurality of detectors at one depth in said body of water, plus locating a a corresponding plurality of detectors at another depth. It also comprises providing a vertical spacing between said two pluralities of detectors sufficient to produce an optimum delay time between vertical-travelling energy arrivals at said pluralities of detectors; and spacing said plurality of detectors in each depth group horizontally apart to extend over a predetermined range from the location of said source of seismic energy. Also, it comprises subtracting the signals generated by said plurality of detectors at one depth from the signals generated by the corresponding plurality of detectors at the other depth, in order to cancel horizontal-travelling seismic energy while reinforcing vertical-travelling energy, and recording said subtracted signals in order to be able to determine seismic reflection data without interference from horizontal-travelling energy.

Once more, briefly, the invention concerns seismic reflection-type surveying carried out in water-covered areas. It concerns a method for eliminating horizontal seismic energy that interferes with vertical reflection energies. The method comprises the steps of creating a source of seismic energy in said water, and locating a first plurality of hydrophones spread out over a predetermined horizontal range from said source of seismic energy. It also comprises locating a second plurality of hydrophones corresponding with said first plurality and spread over the same horizontal range but at a vertically spaced distance from said first plurality, and subtracting the signals generated by one of said plurality of hydrophones from the corresponding signals generated by the other of said plurality of hydrophones in order to eliminate said horizontal seismic energies. It also comprises filtering the signals resulting from said subtraction in order to restore the phase of said resulting signals, and recording said filtered signals in order to be able to determine seismic reflection data with said horizontal energy eliminated.

BRIEF DESCRIPTION OF THE DRAWINGS

The foregoing and other objects and benefits of the invention will be more fully set forth below in connection with the best mode contemplated by the inventor, and in connection with which there are illustrations provided in the drawings, wherein:

FIG. 2 is a block-type schematic diagram illustrating the steps employed in handling the signals in accordance with the invention, and FIG. 3 is a diagrammatic showing of idealized waveform signals for illustrating the invention.

DESCRIPTION OF THE PREFERRED EMBODIMENT

Figure 1:
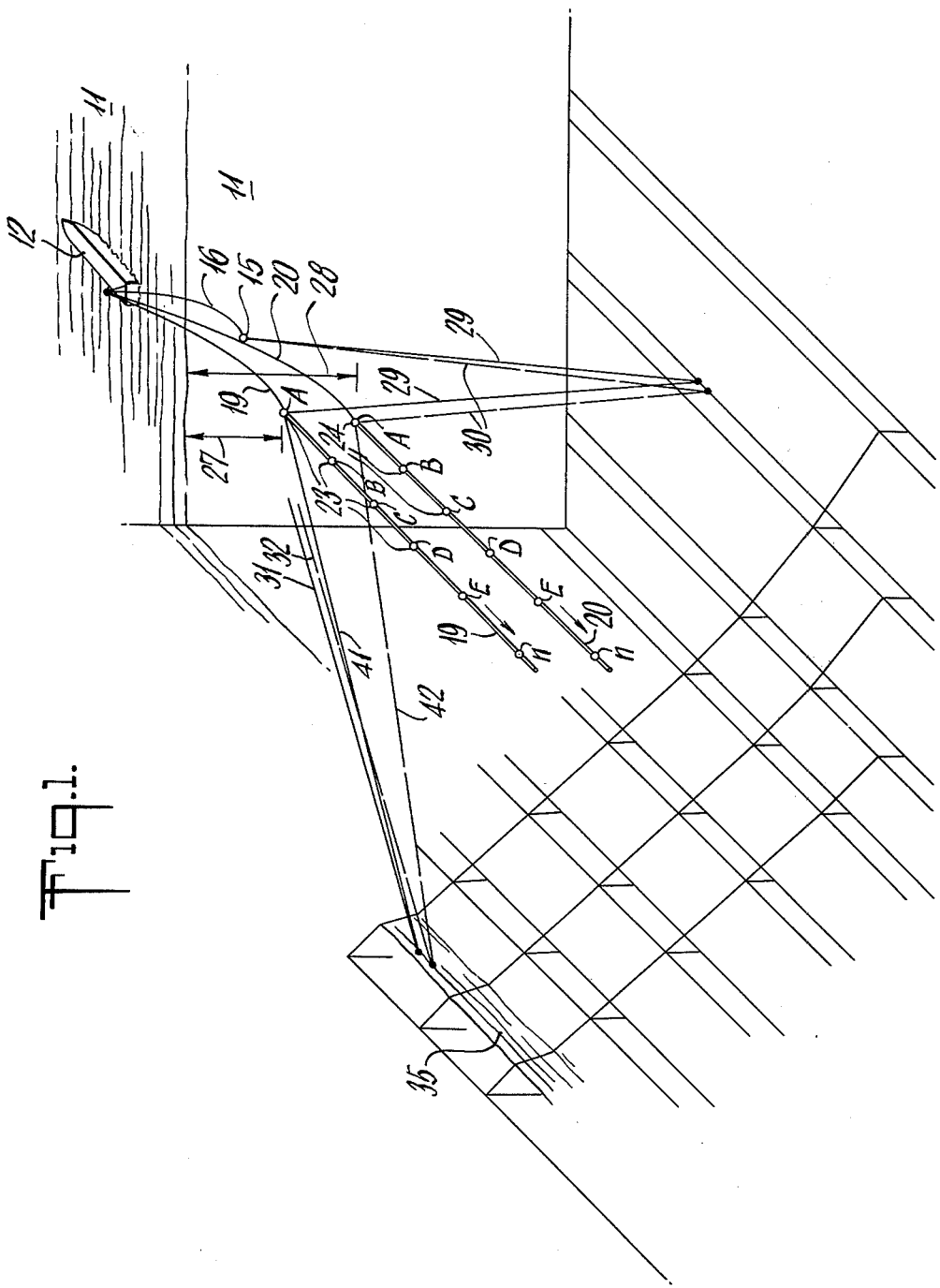
FIG. 1. is a schematic perspective illustrating the basic elements of a marine seismic surveying operation according to this invention.

In making reflection-type seismic surveys of water-covered areas, otherwise called marine reflection-type seismic surveying, the meaningful signals arrive from below the body of water and are travelling in a vertical direction. However, water is an efficient propagator of sound, and so seismic energy waves travel long distances horizontally. Consequently, there may often be interfering horizontal-travelling energy present. For example, another seismic crew surveying in the same general area, will produce horizontally travelling energy from the source being used and from the vessel itself. Also, horizontal energy may be reflected from point sources or line sources located in the water.

In order to eliminate the effects of horizontally travelling energies, a method according to this invention may be employed.

Thus, with reference to FIG. 1, there is schematically indicated a body of water 11. There is a reflection-type seismic survey being conducted along a predetermined profile path or line over the bottom of the body of water 11. Making such a survey involves a vessel, or boat 12 that carries the necessary electrical and electronic equipment (not shown) which is used in carrying out the well-known procedures employed in reflection-type seismic operations. The vessel 12 is navigated over the desired path for a seismic profile while it tows a seismic source 15 that is attached to a cable 16. Electrical equipment on board the vessel 12 will control the time when seismic energy at the source 15 is generated. It will be appreciated that source 15 might take various forms including an explosive charge, or sudden release of compressed air, or the like.

Also towed by the vessel 12 are two cables 19 and 20. These carry the electrical circuit connections from a plurality of hydrophones, or detectors 23 and 24, respectively, to the instruments (not shown) located on the vessel 12.

It is pointed out that the cable 19, beginning with the first one of its string of detectors 23, is controlled as to its relative depth beneath the surface of the body of water 11. This is indicated by a depth dimension arrow 27 in the illustration. Similarly, the cable 20 is controlled, beginning with the first of its string of detectors 24, so as to be vertically situated beneath the other string of detectors 23 at a greater depth. This is indicated by another depth dimension arrow 28.

For reasons that will be more fully explained below, it will be observed that each of the hydrophones, or detectors 23 has a corresponding detector, or hydrophone 24 located substantially vertically underneath it. This vertical distance is determined so that the seismic energy arriving in a vertical direction will produce output signals from each of the detectors 23 that are approximately ½ period out of time with the corresponding output signals from the detector 24. One period is the time for one cycle of the signal. In this manner, when the signals from one string of detectors are subtracted from the other, the resulting wave form of vertically travelling seismic energies will be of maximum amplitude, however time shifts from ¼ period to ¾ period will work. On the other hand, as will be more fully explained, when such subtraction of signals is carried out, any horizontally travelling seismic energies will be cancelled.

To illustrate the foregoing, it will be observed that there are two ray paths 29 and 30 that indicate the vertically travelling seismic energy from the source 15 down to the subsurface reflecting layer and back up to the first of the detectors 23 and 24, respectively. The arrival of such energy will have a time difference depending upon the velocity of the seismic waves in the body of water 11 and the difference in the depth 27 and 28. Consequently, this difference is set to produce about a quarter wavelength difference in the corresponding seismic waves that are generated by the detectors.

At the same time, there are two ray path 31 and 32 that indicate horizontally travelling seismic energy from the source 15. These paths continue after reflection from a steep but shallow reflecting surface 35 to be returned along indicated ray paths 41 and 42, respectively, to the first (closest to vessel 12) detector of the group 23 and of the group 24, respectively. The arrival of this energy will be at substantially the same time, i.e., the seismic waves will be completely in phase. Consequently, when the afore-mentioned subtraction of signals is carried out, these horizontally travelling seismic waves will cancel one another completely.

Referring to FIGS. 2 and 3, some additional aspects of the steps employed in carrying out the invention will be described. It will be noted that the signals generated by the detectors 23 (FIG. 1) are carried over the cable 19 to the instruments on the vessel 12. Similarly, the signals generated by the detectors 24 are carried over the cable 20. These instruments include circuits (not shown) for subtracting the signals from the detectors 23 from the signals that are concurrently generated by the detectors 24. This procedure is schematically indicated by designating the individual detectors (or groups) using the capital letters A, B, C, etc., to $n$, depending on how many detectors are employed spaced horizontally apart along each string of detectors 23 and 24. The subtractions are, of course, individually made for each of the channels thus designated by the capital letters, and they may be carried out by appropriate electrical and/or electronic equipment which is merely indicated by a portion 46 of the divided block 47 that is shown in FIG. 2.

It will be appreciated that there will usually be a substantial number, e.g., 24, individual detectors (or detector groups), which will each provide a signal channel of seismic data in the usual manner for reflection seismic surveying. The subtractions carried out by the circuits in the portion 46 of block 47, will subtract corresponding signals from each detector, or group of detectors, to provide a resultant signal for that channel. This is indicated by a number of arrows 50, 51 and 52 on the portion 46.

Following the subtractions, the signals from each channel are passed through a restoring filter 55. Such filters are indicated by the caption on the other half of block 47. The restored signals provide seismic reflection data with horizontally travelling seismic energies eliminated so that no interference from the above indicated sources remains. These signals are transmitted to a recorder 60 where the plural seismic traces are reproducibly recorded. The recording is commonly done on magnetic tape and may be monitored in visual form. This is done so that the seismic data may be evaluated in a conventional manner.

FIG. 3 illustrates, in idealized form, the signals that are carried on channel A of each of the cables 19 and 20 with resulting signals following subtraction and filtering, as explained above.

Thus, a representative trace 64 illustrates signals being carried on cable 20 from group or detector 24A. A vertically travelling seismic energy wave 65 is illustrated to represent a typical reflection wave being received by that detector. Spaced a short time later on the same channel, a wave 66 is illustrated to represent one created by horizontally travelling seismic energy.

It will be understood that the traces illustrated in FIG. 3 have a time scale from left to right, and they are vertically aligned. Consequently, on the corresponding channel A of cable 19, the seismic energy developed by detector 23A, is represented by a trace 70. This trace has a corresponding wave 71 which, as explained above, arrives about ½ cycle later than the corresponding wave 65 on the channel 24A of the cable 19. Also, in a similar manner, at a time which is later on trace 70, there is a wave 72 that is created by the horizontally travelling seismic energy which is the same as that indicated above as being represented by the wave 66 on trace 64. It will be noted that these horizontal energy waves 66 and 72 are exactly in time, which is because the horizontally travelling energy reaches these corresponding detectors simultaneously.

A trace 75 represents the resulting signal on channel A which is developed by subtracting the signals on the trace 70 from the signals on the corresponding trace 64. It will be observed that this produces a wave 76 with high amplitude but with slightly different shape relative to the waves 65 and 71. Also, it produces a complete cancellation of the other two waves 66 and 72.

After the subtraction has eliminated the horizontal energy, the signals are restored as represented by a trace 78 which thus produces a wave 77 with the restoring filter.

While the invention has been described above in considerable detail in accordance with the applicable statutes, this is not to be taken as in any way limiting the invention but merely as being descriptive thereof.

I claim:

1. In marine reflection-type seismic exploration, a method for improving the character of recorded data developed from seismic detectors located in a body of water, comprising
    creating a source of seismic energy in said body of water,
    locating two of said detectors spaced vertically apart at corresponding horizontal positions in said body of water,
    subtracting all the signals generated by one of said detectors from all the signals generated by the other of said detectors in order to cancel horizontally travelling seismic energy arriving simultaneously while reinforcing vertically travelling energy arriving about ½ cycle out of phase.

2. A marine seismic method according to claim 1, wherein
    said step of locating comprises a vertical spacing sufficient to produce an optimum delay time between vertically travelling energy arriving at said detectors.

3. A marine seismic method according to claim 2, further comprising
    recording said subtracted signals in order to be able to determine seismic reflection data without interference from horizontally travelling energy.

4. A marine seismic method according to claim 3, wherein said step of locating includes a plurality of detectors at one depth and a corresponding plurality of detectors at another depth beneath the surface in said body of water.

5. A marine seismic method according to claim 4, wherein said pluralities of detectors are spaced horizontally apart to extend over a predetermined range from the location of said source of seismic energy.

6. In marine reflection-type seismic exploration, a method for improving the character of recorded data developed from seismic detectors located in a body of water, comprising
    creating a source of seismic energy in said body of water,
    locating a plurality of detectors at one depth in said body of water,
    locating a corresponding plurality of detectors at another depth,
    providing a vertical spacing between said two pluralities of detectors sufficient to produce an optimum delay time between vertically travelling energy arrivals at said pluralities of detectors,
    spacing said plurality of detectors in each depth group horizontally apart to extend over a predetermined range from the location of said source of seismic energy,
    subtracting the signals generated by said plurality of detectors at one depth from the signals generated by the corresponding plurality of detectors at the other depth in order to cancel horizontally travelling seismic energy while reinforcing vertically travelling energy, and
    recording said subtracted signals in order to be able to determine seismic reflector data without interference from horizontally travelling energy.

7. In seismic reflection-type surveying carried out in water-covered areas, a method for eliminating horizontal seismic energy that interferes with vertical reflection energies, comprising the steps of
    creating a source of seismic energy in said water,
    locating a first plurality of hydrophones spread out over a predetermined horizontal range from said source of seismic energy,
    locating a second plurality of hydrophones corresponding with said first plurality and spread out over the same horizontal range but at a vertically spaced distance from said first plurality, and
    subtracting the signals generated by each one of said plurality of hydrophones from the corresponding signals generated by each of the other of said plurality of hydrophones in order to eliminate said horizontal seismic energies.

* * * * *